Sept. 11, 1956 W. L. JEPSON 2,762,913
RAILWAY TRAIN PROXIMITY WARNING SYSTEM
Filed June 13, 1955
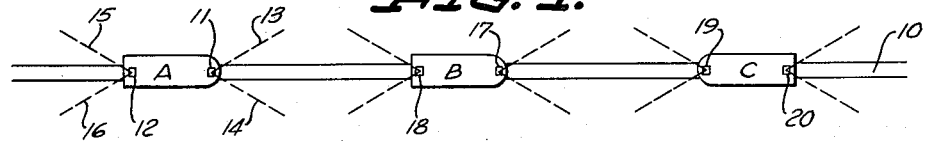
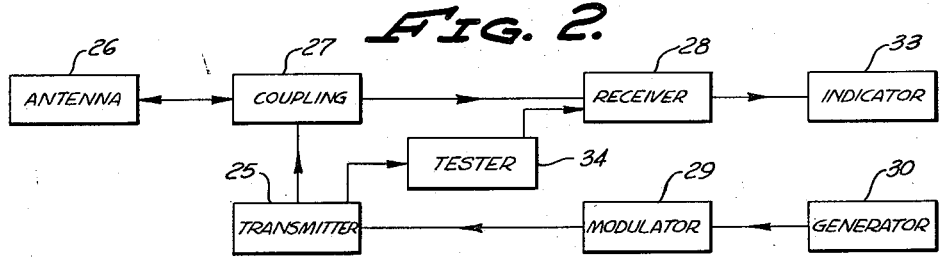
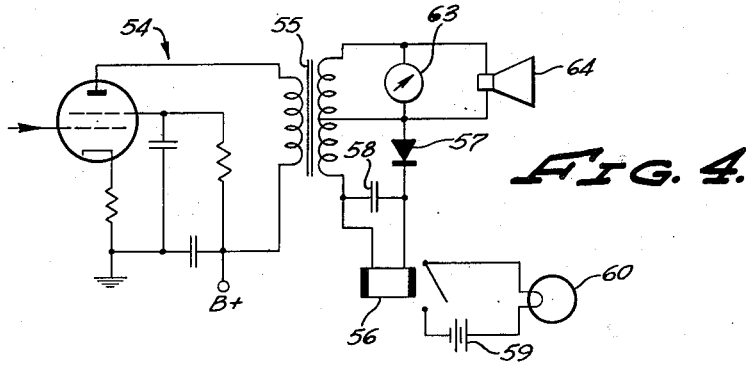
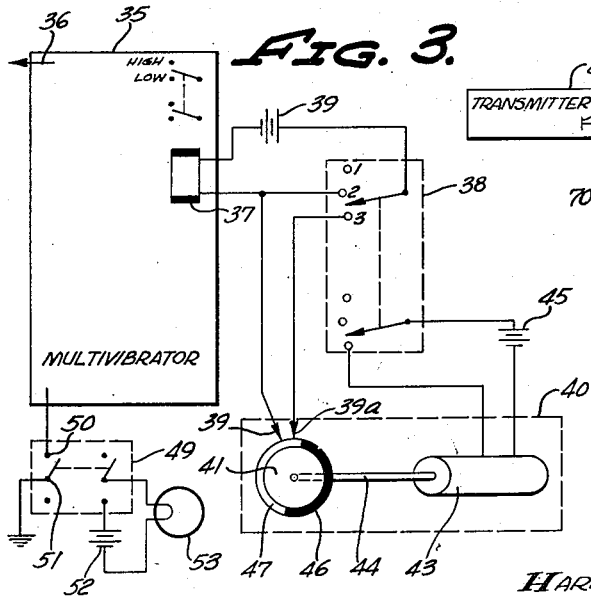
INVENTOR.
WILLIAM L. JEPSON
BY HIS ATTORNEYS.
HARRIS, KIECH, FOSTER & HARRIS United States Patent Office 2,762,913
Patented Sept. 11, 1956

2,762,913

RAILWAY TRAIN PROXIMITY WARNING SYSTEM

William L. Jepson, Los Angeles, Calif.

Application June 13, 1955, Serial No. 514,976

10 Claims. (Cl. 250—2)

This invention relates to warning systems, and more particularly to a system for warning a vehicle of the proximity of another vehicle moving or standing along the same path.

It is an object of the invention to provide a vehicle proximity warning system in which each end of each associated vehicle is provided with a radio transmitter which radiates an identifiable signal ahead of and behind the vehicle and with a receiver which will pick up such signals from other vehicles ahead of and behind the vehicle.

Another object of the invention is to provide a vehicle proximity warning system in which all the necessary equipment is carried in the respective vehicles and in which no connection to or association with external devices is required.

A further object of the invention is to provide a warning system in which only one type of equipment is required and identical units are installed in the front and rear of each vehicle using the system.

Still another object of the invention is to provide a transmitter for a warning system capable of producing either of two identifiable signals and means for switching from one signal to the other depending on the direction of travel of the vehicle.

A further object of the invention is to provide a reproducer fed by the receiver which presents aural and visual indications of the presence of another vehicle ahead of the vehicle carrying the receiver, the indications showing the direction of travel of the other vehicle, the distance from the other vehicle, and the rate of change of the distance.

Another object of the invention is to provide a warning system in which each transmitter and receiver unit is provided with a means for periodically and automatically testing the performance of the unit.

It is a further object of the invention to provide a warning system employing units which are small, light in weight and economical to produce and which may be easily installed and removed.

The invention also comprises novel details of construction and novel combinations and arrangements of parts, which will more fully appear in the course of the following description. However, the drawings merely show and the description merely describes a preferred embodiment of the present invention as applied to a warning system for vehicles, such as railway trains and the like, which is given by way of illustration or example only.

In the drawings:

Fig. 1 is a diagrammatic representation of the invention in use;

Fig. 2 is a block diagram of one embodiment of the units of Fig. 1;

Fig. 3 is an exemplary instrumentation of a portion of the generator of Fig. 2;

Fig. 4 is an exemplary instrumentation of the indicator of Fig. 2; and

Fig. 5 is an exemplary instrumentation of the tester of Fig. 2.

In transportation systems in which more than one vehicle uses the same path or track, the danger of intervehicle collision is always present. In a transportation system in which the speed and momentum of the vehicle are such that it cannot be brought to a stop within the length of path that can be clearly seen ahead of the vehicle, a means of determining if the path beyond the visible range is clear becomes essential. Such a means should be restricted to the vehicles involved and should not depend upon external devices not associated with the vehicles, and its proper operation should be monitored by persons in the vehicle. The proximity warning system of the invention provides such a means. While the invention is equally applicable to any transportation system, it is particularly well adapted to use with railways and its various features will be described in connection with a railway.

Referring to Fig. 1, a railway train A is shown traveling in a left to right direction on a track 10. A radio transmitter 11 is mounted on the train at the front end and a similar transmitter 12 is mounted on the train at the rear end. The transmitter 11 radiates a pulsed signal at a predetermined frequency and in a forward direction as indicated by the dotted lines 13, 14. The transmitter 12 radiates a different pulsed signal at the same predetermined frequency and in a backward direction as indicated by the dotted lines 15, 16.

Another train B is on the track 10 and traveling in the same direction as the train A and has similar transmitters 17, 18 mounted on its front and rear ends, respectively. A train C is also on the track 10 and is traveling in the opposite direction to trains A and B. The train C also has similar radio transmitters 19, 20 mounted on its front and rear ends, respectively. In practice the invention is not restricted to three trains, but is applicable to any number of trains similarly equipped.

A receiver, tuned to the predetermined frequency, is mounted adjacent each transmitter and is adapted to pick up from the same direction that the adjacent transmitter radiates. It is preferred in the practice of the invention to construct a transmitter and a receiver in a single case and to have them use a common antenna. In the description following, the numeral for a transmitter will also be applied to the adjacent receiver. The receiver picks up any radiations of the predetermined frequency being directed toward it, demodulates the received radiation and presents the demodulated signal to an observer in the train. The magnitude of the received signal is indicative of the distance between the receiver and the particular transmitter which is being picked up, and the change in magnitude of the signal is a function of the change in the distance between the units.

The pulsed signals radiated by the front end transmitters have a pulse repetition rate of the same general characteristic, and those radiated by the rear end transmitters have a different general characteristic. Hence, the demodulated signal presented by the receiver can be identified as coming from a rear end of a front end transmitter.

For example, consider the situation where train A and train B are moving at approximately the same velocity. The receiver 11 will pick up radiations from the transmitter 18 and present an indication of approximately constant magnitude and having the rear end characteristic, thereby indicating to the observer in train A that there is another train ahead traveling in the same direction and at about the same speed. If the indication were to increase in magnitude, the observer would be warned that the train B was going slower than train A or that it was stopped.

At the same time an observer in train B would receive an indication from the receiver 18 that another train was following train B, since the receiver 18 would be picking up radiation from the transmitter 11 of train A having the front end characteristic. An increase in magnitude in this indication would warn the observer that the distance between the trains was being reduced.

Suppose that trains B and C are traveling toward each other at about the same speed. The receiver 17 will pick up the radiation of the transmitter 19 and present a front end characteristic of rapidly increasing magnitude, thereby warning an observer in train B that another train is ahead of and traveling toward train B.

Each transmitter may be provided with means for generating a front and a rear end signal and a switching system for selecting one or the other. This feature has a number of advantages. All the transmitter units can be made identical and, after installation, the proper signal can be selected depending on the location of each particular transmitter. When the train is operated in the reverse direction, the proper front and rear end signals can be provided by the switching system rather than by moving the transmitters to the opposite ends of the train. Also, a third signal characteristic can be produced by switching a transmitter from front to rear signal, and back to front end signal at a fixed rate. It is preferred that the rate of switching be not greater than once or twice per second so that the front and rear end signals will be easily discernible. This third signal could be used when the train is stationary or it could be used for indicating emergency conditions, such as derailments and the like. The switching system may be manually controlled or means operated from a portion of the train drive system, such as an axle, may be provided to automatically determine which signal is radiated, depending on the direction of travel of the train.

The antenna associated with each transmitter and receiver serves to confine the radiation to a path ahead of or behind the train as the case may be. While the actual antenna pattern is not critical, it has been found that a horizontal beam width of about twenty degrees and a vertical beam width of five to ten degrees will give good performance. It is preferred to have the antenna rotatable in azimuth in order to change the direction of the radiated signals. This feature would be of particular value where the train has been derailed and is resting at an angle with its normal line of travel.

The required operating range of the transmitters and receivers is determined by the character of the transportation system being protected. In railways the critical distance is that just beyond the range of sight and sound, so a maximum range of approximately five miles may be used in the embodiment of the invention herein described. It is always desirable that the maximum range be kept as low as possible because smaller and less expensive equipment may be used.

The frequency of the transmitter is a matter of choice and is not critical. However, it is preferred to use a frequency in the microwave band. In this higher frequency band an antenna having the desired directional characteristics can be made quite small. This is important where clearances along the right of way are close, where wind loading is a factor and where ease of installation and removal must be considered. Furthermore, in the microwave region sky waves and night effects need not be considered. The microwave band is particularly adaptable to railway operation because it has been found that microwave radiation tends to follow the physical contours encountered, such as tunnels, canyon walls, buildings and the rails on the track, thereby increasing the range around curves.

It is not desired that a receiver pick up radiations from a transmitter mounted on the same vehicle, since this would produce a false warning. Because of the antenna directional pattern a front end receiver will not pick up radiation from a rear end transmitter on the same vehicle or vice versa.

To prevent a receiver from picking up from its adjacent transmitter it is necessary that means be provided to disable the receiver while a pulse is being transmitted. In order to insure reception, although each receiver is disabled while the associated transmitter is radiating, it is necessary that each pulsed signal be different from all the other signals and also that each have a front or rear end indication. In this invention this is accomplished by coding the signals using a pulse generator or oscillator for each transmitter which has two possible repetition rates that are distinctly different, such as two hundred pulses per second and two thousand pulses per second. These two distinctly different rates provide the front end and rear end signals.

However if two front end transmitters were operating in synchronism, the receiver associated with each transmitter would be disabled while the other transmitter was radiating, thereby preventing either unit from detecting the presence of the other. This undesirable synchronized blocking condition is prevented by using free running unstabilized generators having repetition rates that continuously vary slight amounts about the design rate. Therefore, a front end receiver will pick up the majority of the pulses radiated from a front end transmitter ahead of it, even though the receiver is being periodically blocked by its adjacent transmitter. If the pulse duration is made small in relation to the interval between pulses, the intervals when a receiver is disabled will be correspondingly small. The indication produced by the receiver in this situation would be easily distinguished from the indication produced if a rear end transmitter were being picked up. Thus it is seen that while all front end transmitters have the same nominal repetition rate which distinctly differs from a second nominal repetition associated with rear end transmitters, each front end transmitter actually radiates at a repetition rate slightly different from other front end transmitters thereby preventing synchronized blocking of its adjacent receiver. The same discussion applies to a rear end receiver picking up another rear end transmitter.

A combined transmitter-receiver unit for installation on the front or rear of a vehicle is shown in Fig. 2. A transmitter 25 is connected to an antenna 26 through a coupling 27. A receiver 28 is also connected to the antenna 26 through the coupling 27. The coupling 27 provides means for disabling the receiver while the transmitter is radiating a pulse, and, if a microwave frequency is used, the coupling may be a microwave duplexer employing a resonant cavity gaseous tube, commonly known as a TR cell, which short circuits the receiver input when large amounts of energy, such as produced by the transmitter, are fed to the duplexer.

The transmitter may be conventional in design and is controlled by a modulator 29 connected thereto and the modulator is controlled by a pulse generator or oscillator 30. The output of the receiver, which also may be conventional in design, is fed to an indicator 33 whereby the received signals are presented to an observer. A tester 34 is coupled to the transmitter 25 to pick up a small fraction of the radiation and is also connected to the input of the receiver 28.

The pulse generator 30 includes a free running multivibrator 35 (Fig. 3) having an output 36 coupled to the modulator 29. The oscillating frequency or pulse repetition rate of the multi-vibrator is controlled by changing the resistance and capacitance values in the circuit, and a relay 37 is provided for performing the change-over. One terminal of the relay is connected to the moving contact of a three-position switch 38 through a suitable power source 39, such as a battery. The other relay terminal is connected to a fixed contact on the switch 38 and also to one contact 39 on a timing unit 40. A second contact 39a on the timing unit is connected to another fixed contact on the switch. The timing unit may be electronic or mechanical and is shown as a disk 41 which is driven by a motor 43 via a shaft 44. Power is provided for the motor from a suitable source, such as a battery 45, which is connected to one terminal of the motor directly and to the other terminal through a second movable contact and a fixed contact on the switch 38. The rotating disk 41 has a conducting section 46 and a nonconducting section 47 around its periphery on which the electrical contacts 39, 39a ride.

When the moving contacts of the switch 38 are in position 1, the relay 37 is open and the pulse generator is operating at the higher repetition rate. When the contacts are in position 2, the relay 37 is energized and the generator operates at the lower rate. When the contacts are in position 3, the motor 43 drives the disk 41 and the relay is alternately energized and open, thereby producing the standing or emergency signal referred to above.

When a train is on a siding or in some other position of safety, the transmitters on that train should be shut off. However, it is desirable that the receivers remain in operation to inform the observers of the presence of other trains. This is accomplished by means of another switch 49. The cathodes of the tubes of the multi-vibrator 35 are connected to ground through a pair of contacts 50, 51 of the switch 49. When these contacts are open the multi-vibrator does not run and there is no generator output and, hence, no transmitter radiation. However, the action of the receiver is not affected. The switch 49 has another set of contacts connected in series with a power source 52 and an indicator 53, such as a battery and a lamp bulb, respectively. The switch is connected so that when the multi-vibrator cathode circuit is open the lamp circuit is closed, thereby giving a warning that the transmitter is out of operation.

The output of the receiver is an audio frequency corresponding to the repetition rate of the pulsed signal received. This audio frequency is fed to the indicator 33 and there amplified in a power amplifier 54 (Fig. 4). The output of the amplifier may be used to provide both aural and visual indications of the received signals. A secondary winding of the output transformer 55 of the amplifier 54 is connected to a relay 56 through a rectifier 57. A capacitor 58 is connected in shunt across the relay terminals. A series circuit including a battery 59 and a lamp 60 is completed through the relay contacts which are normally open. When the receiver output goes above a predetermined minimum the relay is energized lighting the lamp 60. Another secondary winding of the transformer 55 is connected to an output meter 63 and a speaker 64. The meter gives an indication of the magnitude of the received signal and is preferably logarithmic, thereby making changes in meter deflection directly proportional to changes in distance from the transmitter. The speaker 64 produces an audio frequency tone, the volume being proportional to the distance from the transmitter and the frequency indicating whether the transmitter is a front or rear end unit. A visual indication distinguishing front and rear end signals may be provided by using two meters similar to the meter 63 and placing a filter circuit ahead of each meter, one filter circuit rejecting the front end signal, the other rejecting the rear end signal.

In the use of such a warning system, it is essential that the observer have confidence in the system. In Fig. 5 a means for giving a periodic and automatic check on the operation of both the transmitter and receiver components is shown. A small portion of the transmitter output is obtained for use as a test signal, as by a capacity pick-off 66 coupled to the transmitter. The pick-off 66 is connected to a contact on a relay 67 by a conductor 68. The magnitude of the test signal is set to the desired level by a volume control consisting of a capacitor 69 and an adjustable resistor 70. The other contact of the relay 67 is connected to the receiver input at point 71. The relay 67 is periodically energized by a battery 73 and a timer circuit 74 and if all components are functioning, the proper indication will be produced by the indicator unit 33. This output is easily distinguished from those picked up by the receiver through the antenna because of its fixed magnitude and regular recurrence. The coupling 27 which blocks the receiver when the transmitter is radiating does not affect the test circuit because the test signal is connected to by-pass the coupling.

The timer circuit 74 may be similar to the timer circuit 40 of Fig. 3, including a drive motor 75 connected to a rotating disk 76 through a shaft 77, the disk having a conducting strip 78 and a nonconducting strip 79 for contacts 80, 81 to ride on. In the timer 74 the conducting strip 78 occupies only a small portion of the periphery because the test period should not unduly interfere with the ordinary operation of the system.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a warning system for vehicles, the combination of: a plurality of transmitters tuned to the same frequency, one of said transmitters being mounted on the front end and the rear end, respectively, of each of said vehicles, the radiation of said front end transmitters being directed ahead of said vehicles, and the radiation of said rear end transmitters being directed behind said vehicles, each of said front end transmitters including coding means producing a first pulsed signal and each of said rear end transmitters including coding means producing a second pulsed signal; a plurality of receivers tuned to said frequency, one of said receivers being mounted adjacent each of said transmitters, said front end receivers being adapted to pick up radiation only from ahead of said vehicles and said rear end receivers being adapted to pick up radiation only from behind said vehicles; and control means coupled to each of said receivers rendering each of said receivers inoperative during periods of radiation of the adjacent transmitter, said first signal being characterized by a pulse repetition rate that can be picked up by a receiver adjacent a transmitter radiating said second signal, and said second signal being characterized by a pulse repetition rate that can be picked up by a receiver adjacent a transmitter radiating said first signal.

2. A combination as defined in claim 1, in which each of said first signals and each of said second signals is characterized by a different repetition rate so that each signal can be picked up by any of said receivers, except that receiver adjacent the transmitter radiating said signal.

3. In a unit for a vehicle proximity warning system, the combination of: a unidirectional antenna; a transmitter coupled to said antenna in power feeding relationship; coding means connected to said transmitter for controlling the output of said transmitter, said coding means being capable of producing either a first pulsed signal or a second pulsed signal; selector means connected to said coding means in controlling relationship to control which of said signals is produced; a receiver coupled to said antenna; and control means coupled intermediate said antenna and said transmitter and receiver, said control means blocking transmission of energy from said antenna to said receiver when said transmitter is radiating, each of said signals being characterized by pulses such that while said transmitter is radiating either of said signals and a similar transmitter is radiating the other of said signals, said receiver can pick up said other signal.

4. A combination as defined in claim 3, in which said selector means includes drive means for continuously switching said coding means output from one of said signals to the other in timed relationship.

5. A combination as defined in claim 3 including means connecting said selector means to the drive system of said vehicle whereby said first signal is produced when said vehicle is moving in the forward direction and said second signal is produced when moving in the reverse direction.

6. A combination as defined in claim 3, including conductor means coupling said transmitter to said receiver in power feeding relationship, said conductor means by-passing said control means; and switch means connected in said conductor means intermediate said transmitter and receiver, said switch means periodically interrupting said coupling between said transmitter and receiver.

7. In a vehicle proximity warning system, the combination of: first transmitting means mounted on the front ends of said vehicles and radiating in a forward direction pulses of electromagnetic energy of fixed frequency and a first rate; second transmitting means mounted on the back ends of said vehicles and radiating in a backward direction pulses of electromagnetic energy of said frequency and a second rate; receiving means mounted on said front and rear ends of said vehicles, said front end receiving means picking up said pulses radiated from ahead of said vehicles toward said vehicles, and said back end receiving means picking up said pulses radiated from behind said vehicles toward said vehicles; and means connected to each of said receiving means and disabling said receiving means when the transmitting means on the same end of the same vehicle is radiating, said first pulse rate being related to said second rate so that a front end receiving means can pick up pulses of energy from a back end transmitting means while the related front end transmitting means is operating, and so that a back end receiving means can pick up pulses of energy from a front end transmitting means while the related back end transmitting means is operating.

8. In a vehicle proximity warning system, the combination of: a first plurality of transmit-receive units, each mounted on the front end of a vehicle and each having an antenna directing pulse energy of a given frequency ahead of said vehicle and a coupler blocking the receiving portion of said unit while a pulse is being transmitted; a second plurality of transmit-receive units, each mounted on the rear end of one of said vehicles and each having an antenna directing pulse energy of said frequency behind said vehicle and a coupler blocking the receiving portion of said unit while a pulse is being transmitted; a first plurality of pulse generators, each connected to one of said front end units, said first generators producing continuous trains of pulses, each of said first generators being characterized by a particular pulse rate; and a second plurality of pulse generators, each connected to one of said rear end units, said second generators producing continuous trains of pulses, each of said second generators being characterized by a particular pulse rate, and each varying in pulse rate from any of said first generators by substantially more than said second generators vary from each other, and each of said first generators varying in pulse rate from any of said second generators by substantially more than said first generators vary from each other.

9. A combination as defined in claim 8 including a plurality of reproducing means, each connected to one of said units and producing a first indication when said unit is receiving said pulse energy from any of said front end units, and a second indication when said pulse energy is received from any of said rear end units.

10. A combination as defined in claim 9 in which said reproducers include aural and visual indicating means.

No references cited.